(12) United States Patent
Schumacher et al.

(10) Patent No.: US 7,802,811 B2
(45) Date of Patent: Sep. 28, 2010

(54) SAFETY SYSTEM FOR VEHICLE OCCUPANTS

(75) Inventors: Hartmut Schumacher, Freiberg (DE); Ruediger Karner, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 11/885,890

(22) PCT Filed: Jan. 27, 2006

(86) PCT No.: PCT/EP2006/050484

§ 371 (c)(1),
(2), (4) Date: Apr. 24, 2008

(87) PCT Pub. No.: WO2006/094859

PCT Pub. Date: Sep. 14, 2006

(65) Prior Publication Data

US 2008/0236928 A1 Oct. 2, 2008

(30) Foreign Application Priority Data

Mar. 11, 2005 (DE) ........................ 10 2005 011 242

(51) Int. Cl.
*B60R 21/16* (2006.01)

(52) U.S. Cl. ..................................................... 280/735
(58) Field of Classification Search .................. 280/735
See application file for complete search history.

(56) References Cited

U.S. PATENT DOCUMENTS

| RE34,637 | E | * | 6/1994 | Burger et al. | 280/735 |
|---|---|---|---|---|---|
| 5,484,166 | A | * | 1/1996 | Mazur et al. | 280/735 |
| 5,964,478 | A | * | 10/1999 | Stanley et al. | 280/735 |
| 2003/0100982 | A1 | * | 5/2003 | Rao et al. | 701/45 |
| 2006/0108781 | A1 | * | 5/2006 | Giordano | 280/735 |

FOREIGN PATENT DOCUMENTS

| DE | 197 52 622 | 9/1999 |
|---|---|---|
| DE | 100 54 681 | 5/2002 |
| DE | 102 33 587 | 12/2003 |
| JP | 2000-25556 | 1/2000 |
| JP | 2001-130368 | 5/2001 |
| WO | WO 00/18618 | 4/2000 |

* cited by examiner

*Primary Examiner*—Faye M. Fleming
(74) *Attorney, Agent, or Firm*—Kenyon & Kenyon LLP

(57) ABSTRACT

A safety system for vehicle occupants includes at least one sensor, at least one actuator, and at least one control unit having output stages for controlling the at least one actuator. The safety system includes an arrangement for the activation of actuators not activated during an accident.

19 Claims, 4 Drawing Sheets

10

SAFETY SYSTEM FOR VEHICLE OCCUPANTS

BACKGROUND OF THE INVENTION

1. Field of the Invention

The present invention relates to a safety system for vehicle occupants, which safety system enables controlled actuation of safety devices which have not been actuated in an accident.

2. Description of Related Art

A safety system of this type is described, for example, in the article by W. Suchowerskyj "*Evolution en matiere de detecteurs de choc*" ("Evolution in the Area of Shock Detectors") in 1141 *Ingenieurs de l'Automobile (Automotive Engineers)* (1982) No. 6, pages 69 through 77, Paris. The safety system includes at least one sensor, especially a sensor sensitive to acceleration, a control unit, as well as restraint devices such as airbags and seat-belt pretensioners. Modern safety systems are provided with airbags able to be triggered in multistages. Only individual stages or all stages are triggered, depending upon the crash situation. For safety reasons, an activation can only take place when circuit elements in connection with the control unit have enabled the corresponding firing circuits. In many safety systems, this enabling only takes place for a comparatively short time interval on the order of a few 10 ms. If, in the case of airbags able to be triggered in multistages, only one stage has deployed and at least one stage is still capable of being activated, this represents a potential danger for rescue crews at the accident site or for maintenance personnel in the garage, since an uncontrolled triggering of this/these stage(s) still able to be activated cannot be ruled out with certainty in a crashed vehicle. However, the completely unexpected triggering of a restraint device, especially an airbag, can lead to injuries for rescue and/or maintenance personnel not prepared for it. Furthermore, in the case of seat-belt pretensioners equipped with a belt-force limiter, the requirement also exists to activate the belt-force limiter only after a certain time has elapsed since triggering the seat-belt pretensioner. To satisfy these requirements, in known systems, a prolongation of the enabling for the firing circuits is input manually. The manual input influences a computer program which is responsible for controlling the firing circuits. In this known system, a decrease in protection from an unwanted triggering of a restraint device due to an unintended input of an enabling interval which is too long cannot be ruled out with absolute certainty. Moreover, since the enabling is extended only once within an enabling sequence, a poorly selected triggering instant may disadvantageously result in subsequent stages not being triggered, although the severity of the crash actually requires it.

A BRIEF SUMMARY OF THE INVENTION

The present invention permits a lower-risk way of dealing with vehicles equipped with actuators in the form of restraint devices able to be activated in response to an accident. Because the safety system includes means for activating actuators not activated in response to a crash, the danger that a possibly still intact airbag will deploy at an unwelcome time may be reduced considerably. For example, when rescue crews rushed to a crash site are dealing with the rescue of injured vehicle occupants, or maintenance crews are busy with the recovery and possible repair of a vehicle involved in an accident. The design approach according to the present invention offers special advantages in the case of airbags able to be triggered in multistages (so-called-smart airbags). Depending upon the severity of the crash, it may be that only one stage will activate, while further stages are not activated and represent a potential risk for recovery crews. Particularly advantageously, the present invention provides circuit elements which conductively control the output stages for the control of the at least one actuator again during a second period of time after a first control phase in which the output stages were conductively controlled has elapsed. Because the decision for prolonging the enabling or for control into a conductive phase is directly coupled to the triggering of one or more freely selectable firing means, an unnecessary enabling prolongation can be ruled out from the outset. Since the firing current of the primary firing stage determines the starting instant for the enabling prolongation, the correct instant and the sufficient duration of the enabling are also ensured. The safety system especially advantageously includes storage means for the storage of information about actuators, output stages and their control. Namely, in this way, upon initializing the safety system, it is possible to stipulate which actuators and/or which output stages should be controlled again subsequent to a first control phase. For example, in particular, they may be the airbags controllable in multistages. Moreover, it is especially advantageous that information about a second control phase which has already taken place is also stored. It is thereby possible to prevent actuators already repeatedly controlled from being conductively controlled again. Since with great probability, they have already been activated during the second control attempt, by dispensing with a renewed control attempt, energy from a reserve energy source may advantageously be saved.

DETAILED DESCRIPTION OF THE INVENTION

Figure 1:
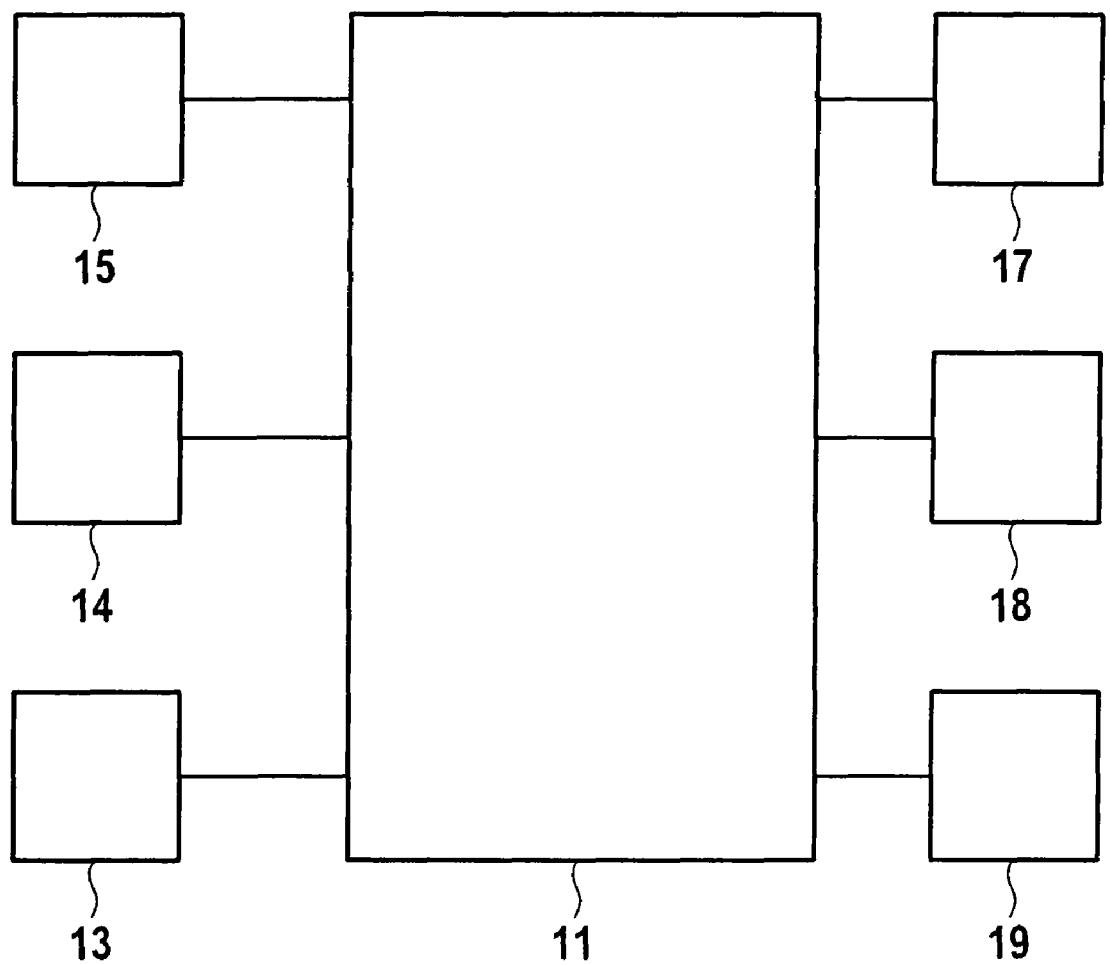
FIG. 1 shows a schematic block diagram of a safety system.

FIG. 1 shows a schematic block diagram of a safety system 10 for vehicle occupants. Safety system 10 includes sensors 13, 14, 15, which are connected to a control unit 11. Safety system 10 also includes actuators 17, 18, 19 likewise connected to control unit 11. Sensors sensitive to acceleration and pressure are used as sensors 13, 14, 15, which record the indicated variables in response to a crash. Moreover, so-called precrash sensors may be used, which sense the vehicle surroundings using radar, laser, ultrasonic and video sensors, and therefore are able to give indications of an imminent crash early on. The actuators are restraint devices for vehicle occupants such as, in particular, airbags and/or seat-belt pretensioners. Control unit 11 evaluates the output signals from sensors 13, 14, 15, and controls actuators 17, 18, 19 as a function of these output signals.

Figure 2:
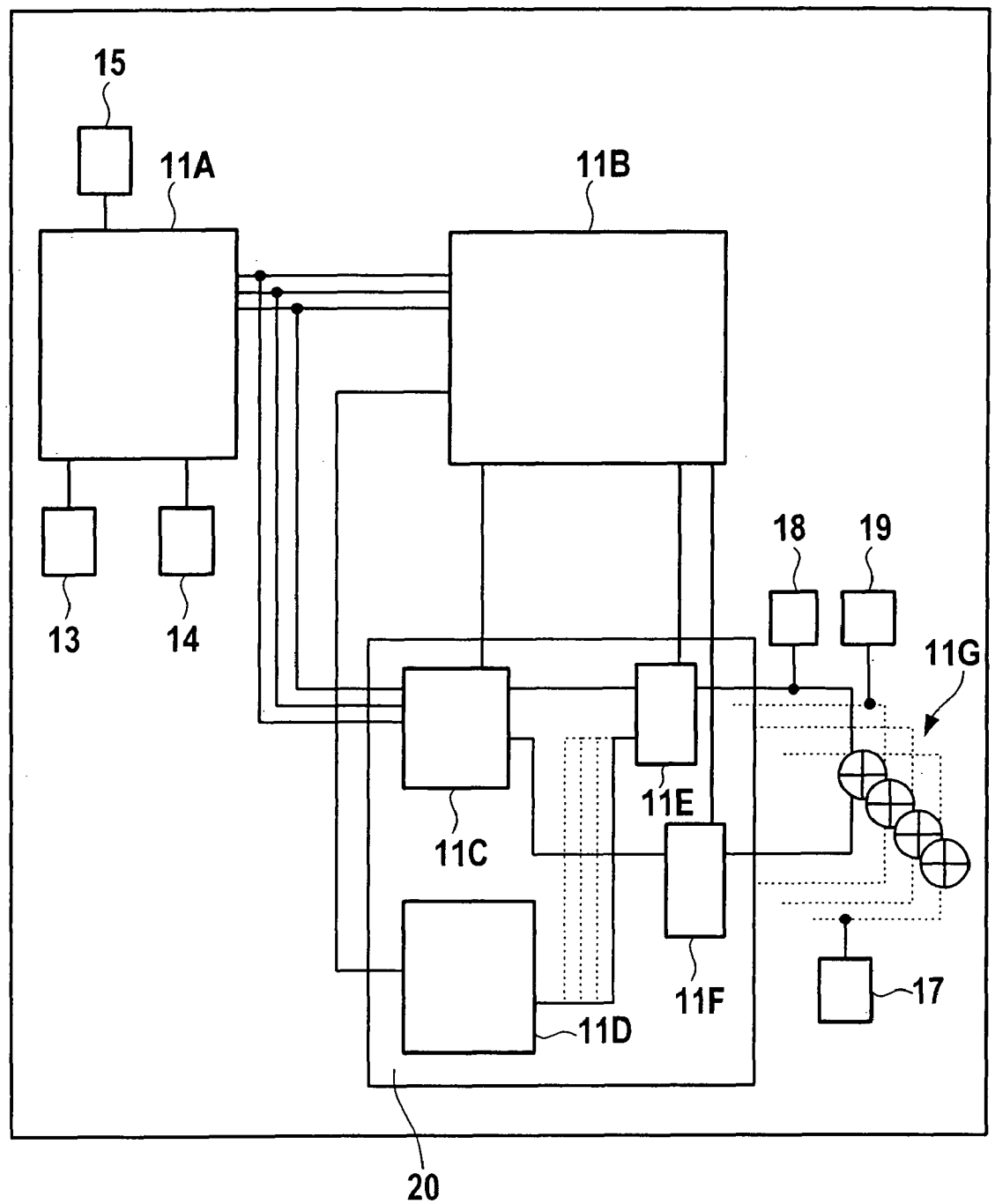
FIG. 2 shows a detailed block diagram of a safety system.

FIG. 2 shows a somewhat more detailed block diagram of a safety system 10 configured according to the present invention. Sensors are again denoted by 13, 14, 15, actuators by reference numerals 17, 18, 19. Control unit 11 includes at least one microcontroller 11A. Sensors 13, 14, 15 are connected to microcontroller 11A. Control unit 11 further includes a firing-stage circuit 20 and a safety circuit 11B. Microcontroller 11A is connected to firing-stage circuit 20 and safety circuit 11B. Safety circuit 11B is connected to firing-stage circuit 20. Firing-stage circuit 20 is connected to firing means 11G. In turn, firing means 11G are operatively connected to actuators 17, 18, 19, such as airbags and/or seat-belt pretensioners in particular. Firing-stage circuit 20 includes firing stages 11E, 11F which, with in each case a firing means 11G, form a series circuit. Two firing stages 11E and 11F are provided for each firing means 11G. Firing stage 11E is also known as HS firing stage (HS=high side), since it is connected between the positive pole of the operating voltage and a firing means 11G. Firing stage 11F is also known as LS firing stage (LS=low side), since it is connected between the negative pole of the operating voltage or ground and a firing means 11G. Usually so-called firing pellets are provided as firing means 11G, which are activated by current continuity, and on their part, then activate propellant charges of the restraint devices. A current continuity through a firing means 11G occurs when both firing stages 11E, 11F are switched to continuity, and thus permit a flow of current through firing means 11G. Restraint devices, such as airbags in particular, may also be multistage, a separate firing means 11G then being assigned to each stage. Depending upon the severity of the accident, at least one stage or several stages are then controlled in order to ensure optimal protection.

Firing-stage circuit 20 further includes a control circuit 11C, which is connected on the incoming side to microcontroller 11A and safety circuit 11B. On the output side, control circuit 11C is connected to each of output stages 11E, 11F. Firing-stage circuit 20 also includes a control circuit 11D, which is connected on the incoming side to safety circuit 11B, and on the output side to output stage 11E.

In the following, the operation of safety system 10 is described with reference to the flowchart shown in FIG. 3. As a rule, safety system 10 is switched on with the start of the vehicle. With the energizing, sensors 13, 14, 15 are also active, and in particular, record acceleration (acceleration sensor), pressure (pressure sensor), as well as data from the area surrounding the vehicle (precrash sensor). The output signals of sensors 13, 14, 15 are fed to microcontroller 11A of the control unit. Microcontroller 11A evaluates the output signals of sensors 13, 14, 15. When the evaluation of the output signals indicates a critical accident situation, microcontroller 11A transmits control signals to firing-stage circuit 20 and safety circuit 11B. Due to these control signals, safety circuit 11B is unblocked and, together with control circuit 11C, permits a control of output stages 11E and 11F such that both output stages 11E and 11F are switched to the conductive state, and therefore allow a flow of current through firing means 11G, which is connected in series to these output stages 11E, 11F. Firing means 11G is activated by the current flow, and therefore on its part, is able to activate an actuator 17, 18, 19.

Figure 3:
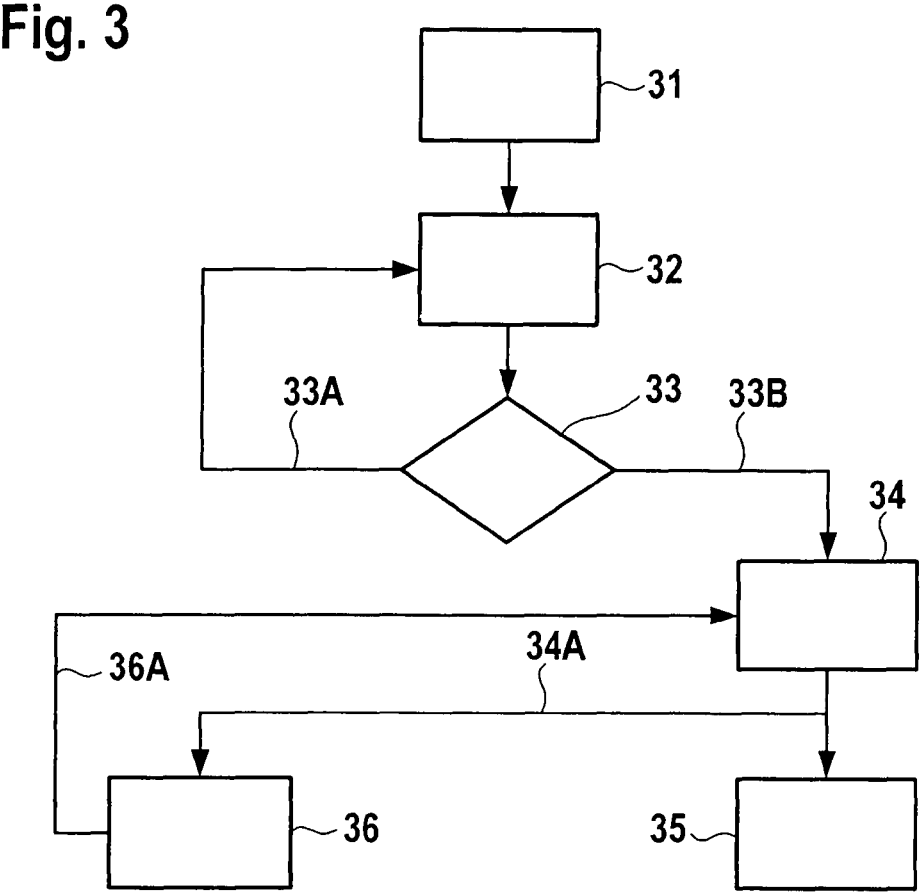
FIG. 3 shows a flow chart illustrating a method according to the present invention.

This sequence is now traced step by step with reference to the flowchart shown in FIG. 3. In step 31, safety system 10 is switched on. In step 32, acceleration a is measured, for example, by sensor 13. In step 33, it is determined whether acceleration a has or has not exceeded a specifiable threshold value S. If this is not the case, the sequence branches to step 33A, and there is a return to step 32 in which acceleration a is measured. If the measurement of acceleration a has revealed that specifiable threshold value S was exceeded, the sequence proceeds via step 33B to step 34. In step 34, control circuit 11C and safety circuit 11B control output stages 11E, 11F of firing-stage circuit 20 in such a way that they are switched to the conductive state, and therefore allow a flow of current through a firing means 11G. In step 35, a restraint device (actuators 17, 18, 19), such as in particular an airbag and/or a seat-belt pretensioner, is then activated. In so doing, it is especially advantageous that output stages 11E and 11F are enabled for only a limited time. For example, for several ten ms, particularly 32 ms. The intention is to thereby advantageously prevent current from continuing to flow after activation of a firing means 11G, which could be the case, for instance, in the event of a short circuit of firing means 11G. Such a needless current flow would, of course, place an unnecessary demand on the reserve energy source which, in the event the vehicle battery pulls off due to a crash, would still be available as the only energy source for the activation of further firing means 11G. Usually capacitors having great capacitance are used as reserve energy source. As soon as a firing current begins to flow with step 34, at the same time the sequence proceeds via step 34A to step 36. In step 36, control circuit 11D, which records and evaluates the firing current, is active. As soon as this control circuit 11D has recorded a current flowing through conductively controlled output stages 11E, 11F within a first time interval, it relays a control signal to safety circuit 11B. Safety circuit 11B interprets this control signal as a desire to prolong the enabling, and causes the safety circuit to enable output stages 11E, 11F for an additional period of time. This correlation is clarified by FIG. 4.

Figure 4:
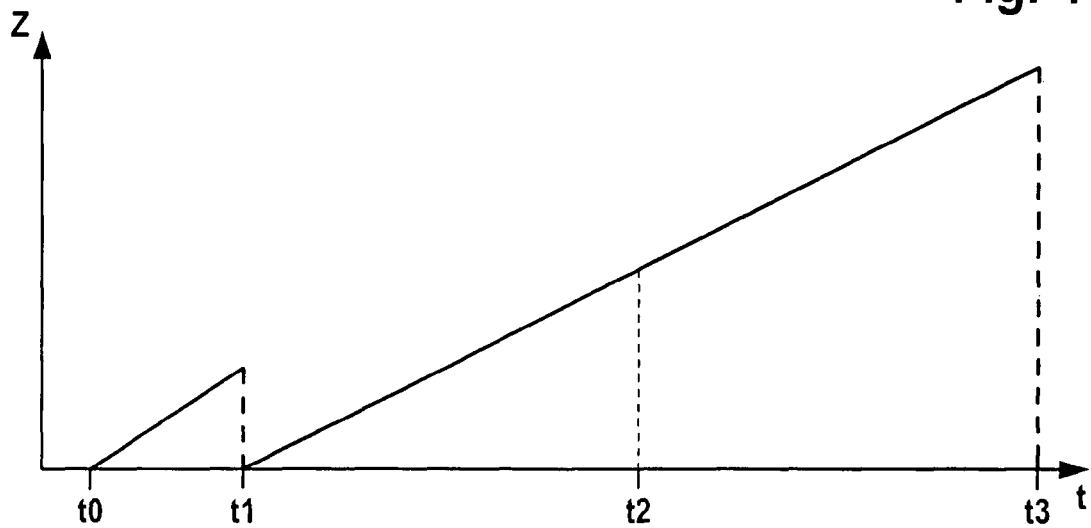
FIG. 4 shows a graph representation of a counter content as a function of time.

FIG. 4 shows the reading of a counter Z as a function of time t. Namely, in one embodiment variant of the present invention, control circuit 11D advantageously includes a counter Z. The control signals output by control circuit 11D are a function of the reading of this counter Z. For example, at instant t0, control circuit 11D detects a flow of current through conductively controlled output stages 11E, 11F, and counter Z begins to run up. After 32 ms, instant t1 is reached, and the enabling time originally provided by safety circuit 11B is ended. At this instant t1, the reading of counter Z is expediently reset. However, if firing means 11G are present which have not yet been activated, safety circuit 11B is unblocked for a specifiable time interval t1-t2, or alternatively t1-t3, by a control signal from control circuit 11D. In one advantageous embodiment variant, different time durations of, e.g., 256 ms and 512 ms may also be provided. During this additional time interval, a sufficiently great firing current may then be fed via respective conductively controlled output stages 11E, 11F to firing means 11G possibly not activated, in order to activate them. Activated firing means 11G are then able to deploy restraint devices possibly not yet activated. In this manner, any danger for rescue crews and/or maintenance personnel in garages may then be avoided. Particularly advantageously, firing-stage circuit 20 includes first registers R1 (FIG. 5), by which those output stages 11E/11F are selected that are intended to lead to a prolongation of the enabling time in safety circuit 11B. These registers are programmed during the initialization of safety system 10, and are subsequently locked to prevent a later change to the programming. Firing-stage circuit 20 further includes second registers R2, in which those output stages 11E, 11F are marked for which a prolongation of the enabling time has already taken place. These registers R2 must remain writable during the operating time of safety system 10, in order to be able to record changes taking place. Counter reading Z of the counters disposed in control circuits 11D provided for a prolongation is expediently monitored for a counter reading unequal to zero. If, because of a control of corresponding output stages 11E, 11F and a resulting flow of current through a firing means 11G, counter reading Z of the counter is increased, then a corresponding control signal is supplied to safety circuit 11B. At the same time, second register R2 stores for which of the output stages 11E, 11F a prolongation of the enabling duration is already requested. Should a further prolongation be requested for the output stages concerned, this request is denied. This procedure is clarified in the following with reference to FIG. 5.

Figure 5:
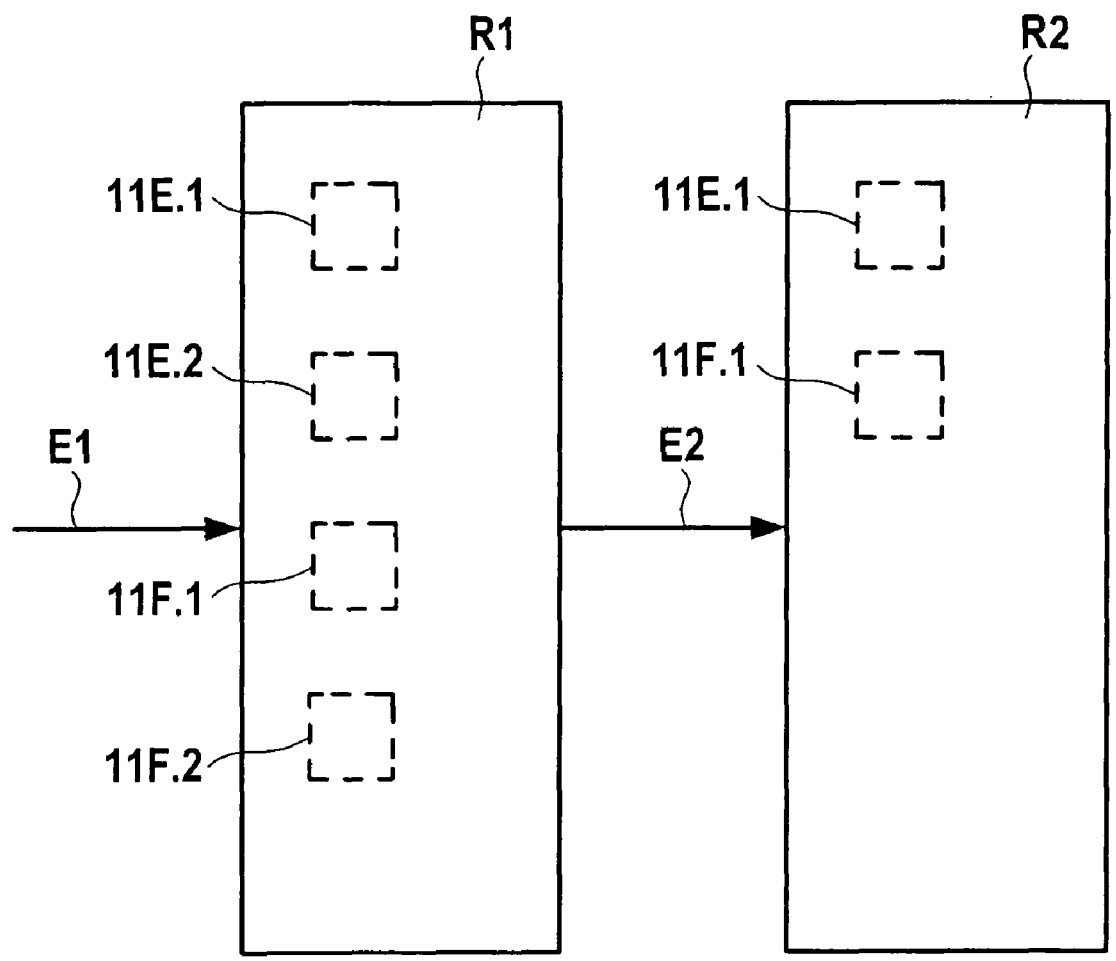
FIG. 5 shows a block diagram of a memory device in a safety system according to the present invention.

FIG. 5 shows a first register R1 and a second register R2. First register R1 is programmable. During the initialization of safety system 10, information as to for which of the output stages 11E, 11F a prolongation of the enabling time is to be provided is supplied to register R1 via an input E1 and stored in register R1. Primarily output stages of multistage airbags are considered here. Namely, for them there is a higher risk that in the event of an accident, initially only one stage will be activated and deployed. Further stages are not deployed, and therefore under unfavorable circumstances, represent a risk for rescue crews and/or maintenance personnel who approach or repair the vehicle damaged by an accident.

In the exemplary embodiment shown in FIG. 5, register R1 stores the information, that these output stages 11E.1, 11E.2, 11F.1 and 11F.2 are provided for a prolongation of the enabling time. As soon as an output stage 11E, 11F has experienced a prolonged enabling time, corresponding information is written into second register R2 (input E2). The intention is to thereby prevent these output stages from activating an enabling prolongation again. In the exemplary embodiment shown in FIG. 5, output stages 11E.1 and 11E.2 are concerned. Thus, these output stages were already switched to the conductive state beforehand, and had activated an enabling prolongation. The storage of this information in the second register is now intended to prevent these output stages from activating a repeated enabling prolongation during the next program cycle.

The present invention may be embodied advantageously in so-called single-chip systems, in which all components of safety circuit 11B, of firing-stage circuit 20 and their power supply are combined in highly integrated form on a single semiconductor chip. However, the design approach of the present invention is usable, likewise with great success, in so-called standard systems as well, in which the aforesaid functions are realized in separate semiconductor circuits.

What is claimed is:

1. A safety system for occupants of a vehicle, comprising:
a control unit;
at least one sensor operatively connected to the control unit; and
at least two actuators operatively connected to the control unit, wherein each actuator is for actuating one of a passenger-restraint device and a stage of a passenger-restraint device in a case of a vehicle accident;
wherein:
the control unit includes at least one output stage for controlling activation of the two actuators,
the control unit is configured to enable activation of an actuator not activated in a vehicle accident,
the control unit includes at least one circuit arrangement configured to enable the at least one output stage for controlling the at least two actuators, wherein the at least one circuit arrangement enables the at least one output stage for a predetermined first time period and for a predetermined second time period upon expiration of the predetermined first time period, and
the activation of the second time period is determined by a firing current of a primary stage, and
the control unit is configured to prevent each actuator already controlled from being conductively controlled again.

2. The safety system as recited in claim 1, further comprising:
at least one storage element configured to store information regarding control of the at least one output stage and the at least two actuators.

3. The safety system as recited in claim 2, wherein the at least one storage element includes a first register and a second register.

4. A method for controlling a safety system for vehicle occupants, wherein the safety system includes at least one sensor and at least two actuators operatively connected to a control unit, the method comprising:
providing a first specified enabling time interval, wherein at least one of the two actuators is enabled for activation during the first specified enabling time interval in a case of a vehicle accident; and
providing a second specified enabling time interval after expiration of the first specified enabling time interval;
wherein:
at least one actuator not activated during the first specified enabling time interval in the case of a vehicle accident is controlled by the control unit during the second specified enabling time interval,
the activation of the second time interval is determined by a firing current of a primary stage, and
the control unit is configured to prevent each actuator already controlled from being conductively controlled again.

5. The method as recited in claim 4, wherein the first specified enabling time interval is 32 ms.

6. The method as recited in claim 5, wherein the second specified enabling time interval is 256 ms.

7. The method as recited in claim 5, wherein the second specified enabling time interval is 512 ms.

8. The method as recited in claim 4, wherein information regarding an actuator which is to be controlled over a longer enabling time interval between the first and second specified enabling time intervals is stored in a first memory element.

9. The method as recited in claim 8, wherein information regarding an actuator which has been controlled over a longer enabling time interval between the first and second specified enabling time intervals is stored in a second memory element.

10. The method as recited in claim 3, wherein upon an initializing of the safety system, determining which actuators and output stages should be controlled again.

11. The method as recited in claim 1, wherein capacitors are used as a reserve energy source.

12. The method as recited in claim 1, wherein as soon as the control unit has recorded a current flowing through the at least one output stage within a first time period, the control unit relays a control signal to activate a second time period.

13. The method as recited in claim 1, further comprising a counter to set the predetermined first time period and predetermined second time period.

14. The method as recited in claim 3, wherein the first register is programmable and the second register stores for which of the at least one output stage a second time period is already requested and if a second time period is already requested, an additional time period is denied, thereby preventing each actuator already controlled from being conductively controlled again.

15. The method as recited in claim 4, wherein upon an initializing of the safety system, determining which actuators and output stages should be controlled again.

16. The method as recited in claim 4, wherein capacitors are used as a reserve energy source.

17. The method as recited in claim 4, wherein as soon as the control unit has recorded a current flowing through the at least one output stage within a first time interval, the control unit relays a control signal to activate the second time interval.

18. The method as recited in claim 4, further comprising a counter, wherein the counter sets the first time interval and the second time interval.

19. The method as recited in claim 9, wherein the second memory element stores for which of the at least one output stage a second time interval is already requested and if a second time interval is already requested, an additional time period is denied, thereby preventing each actuator already controlled from being conductively controlled again.

* * * * *